US011511664B2

(12) United States Patent
Wilke et al.

(10) Patent No.: US 11,511,664 B2
(45) Date of Patent: Nov. 29, 2022

(54) ILLUMINATION MODULE FOR ILLUMINATING A REGION OF A VEHICLE COMPONENT

(71) Applicant: ILLINOIS TOOL WORKS INC., Glenview, IL (US)

(72) Inventors: Zsolt Wilke, Bad Mergentheim (DE); Steffen Kolb, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 17/549,115

(22) Filed: Dec. 13, 2021

(65) Prior Publication Data
US 2022/0185175 A1 Jun. 16, 2022

(30) Foreign Application Priority Data
Dec. 15, 2020 (DE) ..................... 10 2020 133 498.2

(51) Int. Cl.
| | | |
|---|---|---|
| *B60Q 3/00* | (2017.01) | |
| *B60Q 3/267* | (2017.01) | |
| *B60Q 3/80* | (2017.01) | |
| *B60Q 3/50* | (2017.01) | |
| *B60Q 3/30* | (2017.01) | |
| *B60Q 3/54* | (2017.01) | |

(52) U.S. Cl.
CPC ............... *B60Q 3/00* (2013.01); *B60Q 3/267* (2017.02); *B60Q 3/30* (2017.02); *B60Q 3/50* (2017.02); *B60Q 3/80* (2017.02); *B60Q 3/54* (2017.02)

(58) Field of Classification Search
CPC . B60Q 3/267; B60Q 3/60; B60Q 3/50; B60Q 3/51; B60Q 3/54; B60Q 2400/40

USPC .................................................. 362/509, 546
See application file for complete search history.

(56) References Cited

U.S. PATENT DOCUMENTS

| | | | | |
|---|---|---|---|---|
| 10,293,761 | B2 * | 5/2019 | Topart | B60Q 3/54 |
| 2001/0006465 | A1 * | 7/2001 | Misawa | B60Q 3/267 |
| | | | | 362/399 |
| 2008/0203755 | A1 * | 8/2008 | Bourgeois-Jacquet | |
| | | | | B60K 37/00 |
| | | | | 296/97.5 |

FOREIGN PATENT DOCUMENTS

| | | |
|---|---|---|
| DE | 102006031668 A1 | 1/2008 |
| DE | 102008000375 A1 | 10/2008 |
| DE | 102009024800 A1 | 2/2010 |
| DE | 102011108756 A1 | 2/2012 |
| DE | 102013007383 A1 | 10/2014 |

* cited by examiner

*Primary Examiner* — Laura K Tso
(74) *Attorney, Agent, or Firm* — Thompson Hine LLP

(57) ABSTRACT

An illumination module (1) for illuminating a region of a vehicle component (8), which includes a main body (9). The illumination module (1) includes a light source support (2) having at least one light source (3, 3') and a housing half shell (4), which is connectable to a wall region of the main body (9) of the vehicle component (8) such that a housing defined by the housing half shell (4) of the illumination module, on the one hand, and by the wall region of the main body (9) of the vehicle component (8), on the other hand, is formed. The light source support (2) has the at least one light source received in the housing, at least in regions, and the housing includes at least one light outlet region (5, 5'), via which light emitted by the at least one light source can be decoupled from the housing.

16 Claims, 10 Drawing Sheets

ILLUMINATION MODULE FOR ILLUMINATING A REGION OF A VEHICLE COMPONENT

TECHNICAL FIELD

The present invention relates generally to illumination modules for illuminating, in particular optionally or as needed, a region of a vehicle component, in particular at least one region of a handle assembly or a charging recess or tank recess, wherein the vehicle component includes a main body, that is in particular insertable into an opening of a vehicle body or is in particular connectable directly or indirectly to the vehicle body.

The invention further relates to a vehicle component having such an illumination module.

BACKGROUND

According to one exemplary embodiment, the vehicle component considered herein is, in particular, a handle assembly of a vehicle, and preferably an interior door handle assembly of a vehicle having a housing and an actuating portion disposed on the housing.

The actuating portion can be, for example, a handle portion. The handle lever can be pivotally supported on the main body serving as a housing, for example. The actuating portion can be formed to be gripped by a vehicle occupant in order to open and/or to close a vehicle door from the interior. The housing or main body and the actuating portion are often made of plastic.

Alternatively, the vehicle component considered herein is a charging or tank recess of a vehicle, for example, a PHEV or BEV vehicle.

Vehicles with a hybrid or electric drive have at least one battery or traction battery, which, for example in the case of PHEV vehicles (PHEV=plug-in hybrid electric vehicle) or BEV vehicles (BEV=battery electric vehicle), can be charged via an electrical charging connector that is accessible from the outside on the vehicle body, and is typically a charging socket, by connecting to an electrical charging station, for example, or a conventional home electrical terminal.

The charging connector is usually disposed in a charging recess of the vehicle body, which is generally covered or closed by a closure element. A mechanism that cooperates with the closure element optionally allows the charging recess to be opened and closed or the closure element to be flipped open and closed relative to the charging recess, and thus allows access to the charging connector.

For example, the mechanism can include a so-called push-push kinematics, as is already used in conventional fuel caps. Because, when such a mechanism is used in practice, a seal between the closure element and the charging recess is usually lacking, which would be necessary, however, in order to protect the electrical charging port including metallic contacts against the ingress of dirt, dust, and liquids, in particular water, and thus ensure its permanent functionality, an additional tailgate is currently required, which is inserted or screwed onto the charging port in order to protect the charging port.

By contrast to internal combustion engine vehicles, which are typically filled with fuel at gas stations where the fueling operation occurs either during the day or in an illuminated environment, the charging operation often occurs in the dark in vehicles having a hybrid or electric drive. For example, it is common for a vehicle having a hybrid or electric drive to be recharged in a dark, non-illuminated, underground parking lot. In this case, it is extremely advantageous for the driver to be facilitated with proper illumination in order to locate the charging connector in the charging recess.

For this purpose, it is known to provide illumination in the charging recess. It can also be provided that light sources are arranged around the charging connector in the charging recess in order to identify the charging connector.

In the currently known devices for illumination of a charging connector in the charging recess of a vehicle, for example, an illumination module can be used, wherein the light emitted by the illumination module is coupled into a fiber optics arrangement and transported to the area to be illuminated. In this way, it is possible not to position the illumination module directly on the area of the vehicle component to be illuminated, which is often not possible due to a limited design space on the vehicle component. For this purpose, it is common to position the illumination module remotely from the area of the vehicle component to be illuminated and to guide the light necessary for illumination via a fiber optics arrangement to the area of the vehicle component to be illuminated.

However, the problem with this approach known from the prior art is that the laying of the fiber optics arrangement, in particular, is very labor-intensive. Moreover, with such a fiber optics arrangement, it is often not possible to optionally illuminate the area of the vehicle component to be illuminated.

These disadvantages apply not only in connection with the illumination of a charging connector of a tank recess or charging recess, for example. Rather, the aforementioned problem also applies in the figurative sense for other vehicle components, which are to be illuminated optionally or as needed. An example of this is the actuating portion of an interior door handle arrangement.

As a further example, interior furnishing parts for vehicles are generally mentioned. Such interior furnishing parts are used in interior spaces of vehicles, wherein the interior furnishing parts are used, for example, to clad body elements in the area of the doors. Interior furnishing parts that provide a cladding effect are also used in other areas of the interior of vehicles. These interior cladding parts are made of, for example, different plastic materials, cloth materials, or high-quality materials such as leather, as well as a combination thereof.

Interior cladding parts of this type are often used not only for merely cladding body elements or the like, but are also increasingly used to generate attention among consumers and to enhance the overall appearance of the vehicle. The interior furnishing of a vehicle is therefore an increasingly distinguishing feature and should be designed in order to create style and ambience as desired by the car buyer.

In this context, in particular, there is also a need for illumination solutions that integrate harmoniously with the design theme of the vehicle interior. One of the aspirations among experts in this field is to be able to realize an illumination of the interior that is as unique as possible in a manner that is as easy to realize as possible and without an excessive restructuring of the interior furnishing parts, in order to be able to produce different styles as desired, starting from the reduction to the essentials, emphasis on sportsmanship, or up to a luxury ambience. This is based on the recognition that well-designed and integrated illumination conveys the feeling of well-being and establishes a strong emotional connection to the vehicle. Furthermore, it improves the driving safety at night by illumining controls, stowage compartments, and stowage spaces.

In this context, it is known from the prior art to integrate a laminar backlighting in the interior cladding parts, in particular in the area of the dash and the center console. However, such backlighting has the disadvantage that it can only be adapted to the needs of the customer with considerable effort. In addition, it is usually not possible to achieve a uniform illumination with backlighting when in a laminar sense.

According to other solutions, light emitting diodes are integrated in the interior cladding parts. This approach is also not suitable for integrating large-scale illumination solutions with as little effort as possible.

Moreover, it is also known to use fiber optics for the interior illumination. These are typically fiber optics with a square base surface that is slightly larger than the visible surface revealed by a screen in the interior cladding part. Materials used are, for example, transparent PMMA (polymethyl methacrylate or Plexiglas) or polycarbonate. Over the side surface of the fiber optics, light is coupled. Light sources arranged in points, usually along one or two opposite sides, feed the fiber optics. The light transport within the fiber optics occurs via Total Internal Reflection (TIR). In order to optionally decouple light from the fiber optics, interference sites are generated that disrupt the TIR condition.

The solutions known from the prior art and briefly described above for personalized illumination of a vehicle component, in particular a vehicle interior component, have the disadvantage in particular that these illumination solutions can only be implemented with relatively high effort. Furthermore, the known illumination solutions often cannot be integrated harmoniously into the design theme of the vehicle interior, as additional installation space for the components associated with the illumination solution is required for this purpose.

SUMMARY

On the basis of this situation, the problem to be addressed by the invention is based upon the task of specifying an illumination module, in particular for the optional or as-needed illumination of a vehicle component, with which personalized illumination solutions for the area of the vehicle component to be illuminated can be implemented in a manner that is as simple and as cost-efficient as possible.

In particular, there is a need for illumination modules that can be installed as directly "on-site" as possible, i.e. as directly as possible on the area of the vehicle component to be illuminated, without an excessive need for design space.

Furthermore, the illumination module is intended to be usable for different vehicle components, for example for illumination of an area of a handle arrangement, in particular an interior door handle arrangement, for illumination of an area of a charging recess or tank recess, or for illumination of an area of other interior furnishing parts, for example door cladding parts, dashes, center consoles, etc.

Another problem lies in specifying a corresponding vehicle component having such an illumination module.

The underlying object of the present invention is in particular solved by the subject matter of independent claim 1, which relates an illumination module for illuminating, in particular optionally or as needed, at least one region of a vehicle component, in particular at least one region of a handle assembly or a charging recess or tank recess, wherein the vehicle component includes a main body, which is in particular insertable into an opening of a vehicle body or is in particular connectable (directly or indirectly) to the vehicle body.

Advantageous further developments of the illumination module according to the invention are specified in the dependent claims.

The underlying problem of the invention is also solved in particular by the subject matter of the parallel claim 14, which relates to a vehicle component having a main body and an illumination module, which is connected, in particular detachably and preferably via a clip and/or catch connection, to a wall region of the main body.

The illumination module according to the invention includes a light source support, in particular in the form of a printed circuit board, having at least one light source, preferably in the form of an LED.

Moreover, the illumination module includes a housing half shell. The housing half shell is connectable to a wall region of the main body of the vehicle component, in particular detachably and preferably via a clip and/or catch connection, in such a way that a housing defined by the housing half shell of the illumination module, on the one hand, and by the wall region of the main body of the vehicle component, on the other hand, is formed or can be formed.

In the housing formed from the housing half shell of the illumination module and the wall region of the main body of the vehicle component, the light source support of the illumination module with the at least one light source is received or receivable at least in regions. It is further provided in this context that the housing includes at least one light outlet region, via which light emitted by the at least one light source can be decoupled from the housing.

The advantages achievable with the illumination module according to the invention are obvious: by providing that the illumination module does not have a "complete" housing for receiving the light source support with the at least one light source, but rather only includes a housing half shell, wherein said housing half shell is connected, preferably detachably and in particular via a clip and/or catch connection, to the main body in order to form a complete housing, significant design space savings can be achieved. The invention is in particular based on the finding that a particularly compact design of the illumination module can be realized by the fact that a wall region of the main body of the vehicle component is also used in order to form the housing for receiving the light source support.

This allows the illumination module to be used, in particular, "on-site," i.e. in the immediate vicinity of the area of the vehicle component to be illuminated, without the use of a fiber optics arrangement, which is effort-intensive to lay down and, as described above, also comes with disadvantages in the even and uniform illumination of the area of the vehicle component.

In other words, the illumination module according to the invention can be connected to the main body of the vehicle component in the immediate vicinity of the area of the vehicle component to be illuminated without a significant additional design space being necessary for the integration of the illumination module. The light, which can be decoupled via the at least one light outlet region of the housing and emitted by the at least one light source, can thereby be used directly in order to illuminate the area of the vehicle component to be illuminated.

In this way, cost savings can be realized due to the simplified design and simplified mounting capability of the illumination module. Moreover, optimized illumination of the area of the vehicle component is achievable.

In particular, the illumination module according to the invention is suitable as a standard component for illumination of different vehicle components, for example an area of a handle arrangement or an area of a charging or tank recess. Other possible applications include the illumination of interior furnishing parts, for example, areas of an interior cladding, in particular a door panel, or areas of the dash or areas of a console, in particular a center console of a vehicle.

According to preferred embodiments of the illumination module according to the invention, it is provided that the at least one light source is arranged with respect to the light outlet region of the housing in such a way that the light emitted by the at least one light source can be decoupled via the at least one light outlet region from the housing as scattered light and preferably exclusively as scattered light and in particular as scattered light scattered on at least one interior wall region of the housing half shell and/or the housing.

Here, the at least one interior wall region of the housing half shell and/or the housing preferably has a degree of remission of at least 75%, preferably at least 85%, and more preferably at least 90%.

Alternatively or additionally, it is conceivable here that, for contour illumination, the illumination module includes a preferably replaceable or exchangeable and preferably partially light-opaque masking on the at least one light outlet region and/or a preferably replaceable or exchangeable and preferably partially transparent or translucent cover.

The illumination module is used in particular for room illumination on the one hand, but on the other hand also for identifying or highlighting certain items or objects. Such illuminations are often called contour illuminations, as they visually accentuate the shape or contour of an object to be highlighted. In the interior of vehicles, contour illumination is used, for example, for speakers, buttons and control panels, cup holders, etc. The contour illumination that can be realized by the illumination module can be illuminated strips that are intended to highlight or emphasize certain contours. In particular, the contour illumination can also serve to accentuate the shape or contour of a vehicle logo.

According to realizations of the illumination module according to the invention, the housing includes a first light outlet region preferably for contour illumination and a second light outlet region, arranged separately from the first light outlet region, preferably for ambient illumination, wherein the light emitted in the housing by the at least one light source can preferably be decoupled as scattered light via the first light outlet region in a first solid angle range and via the second light outlet region in a second solid angle range different from the first solid angle range.

For example, it is conceivable that the housing includes a first light outlet region preferably for contour illumination and a second light outlet region, arranged separately from the first light outlet region, preferably for ambient illumination, wherein the light source support includes at least one first light source associated with the first light outlet region and at least one second light source associated with the second light outlet region.

According to realizations of the illumination module according to the invention, it is provided that the illumination module includes a light distributor received at least in regions by the housing half shell, which includes a light inlet region, via which at least a part of the light emitted by the at least one light source can be coupled into the light distributor.

The light distributor further includes at least one light outlet region, via which at least a part of the light coupled via the light inlet region into the light distributor can be decoupled, in particular in the direction of the region of the vehicle component to be illuminated.

In this design variant, in which the illumination module further includes a light distributor received at least in regions by the housing half shell, the housing half shell with the light source support and the at least one light source represents a standardized part of the illumination module, wherein only the light distributor of the illumination module is to be individually adapted to the respective application. In other words, it is only necessary to accordingly adjust the light distributor upon the exit of light from the light distributor in order to accommodate customer-specific requirements.

The light distributor preferably includes a body made of a transparent material, in particular plastic material, which is designed to conduct at least a part of the light coupled via the light inlet region of the light distributor into the light distributor to the at least one light outlet region of the light distributor by reflection at the boundary surface of the body. Transparent PMMA or polycarbonate is mentioned as a conceivable material for the body of the illumination module, although other materials are also generally suitable.

By contrast to a fiber optics, which is typically used for interior illumination, the length of the body of the light distributor is preferably significantly lower compared to the length of the conventionally used fiber optics. Furthermore, the effective cross-sectional area of the light distributor body that is usable for guiding the light is significantly greater compared to the diameter of a commonly used fiber optics. This allows a uniform illumination of the area of the vehicle component to be illuminated.

As indicated previously, personalized illumination solutions are realizable by merely altering the design of the light distributor and thus in a particularly simple and cost-efficient manner.

In this context, in particular, it is provided that the housing half shell of the illumination module according to the invention is configured to preferably receive the light source support via a clip connection.

Alternatively or additionally, it can be provided that the housing half shell includes at least one connecting element, for example in the form of a clip or catch connection element, for the preferably detachable connection of the light distributor to the housing half shell.

This design variant allows in particular the at least one connection element of the housing half shell to be designed to form a detachable connection to light distributors of different types, sizes, and/or forms.

According to realizations of the illumination module according to the invention, it is provided that the main body of the vehicle component includes a window region for receiving, at least in part or at least in regions, the at least one light outlet region of the light distributor.

Here, the light distributor is preferably designed in such a way that in the installed state, a light outlet surface of the at least one light outlet region adjoins flush on the wall region of the main body of the vehicle component surrounding the window region.

In this way, an optimal integration of the illumination module is realizable. Of course, other solutions are possible in this respect, as well.

Different variants come into consideration for the coupling of the light emitted by the at least one light source of the illumination module into the light inlet region of the light distributor:

According to a first variant, it is provided that the at least one light source is arranged with respect to the light inlet region of the light distributor in such a way that at least a part of the light emitted by the at least one light source can be coupled directly into the light inlet region.

By contrast, according to a second variant, it is provided that the at least one light source is arranged with respect to the light inlet region of the light distributor in such a way that the light emitted by the at least one light source can be coupled as scattered light, in particular as scattered light scattered on at least one interior wall region of the housing half shell and/or the housing, into the light inlet region of the light distributor.

The second design variant provides the advantage that light that is homogenized with respect to the intensity can be coupled into the light inlet region of the light distributor. This in turn allows a particularly homogeneous, i.e. even illumination of the area of the vehicle component to be illuminated, when viewed in a laminar sense.

In a preferred further development of the second design variant, it is in particular provided that the at least one interior wall region of the housing half shell and/or the housing preferably has a degree of remission of at least 75%, preferably at least 85%, and more preferably at least 90%.

The degree of remission is the ratio of the luminance remitted from a surface in the measurement direction compared to the luminance of a surface in reference white. The degree of remission has values between 0 (black) and 1 (white) as the quotient and is usually given in percent.

Due to the fact that, in the last mentioned design variant, the interior wall region of the housing half shell or the interior wall region of the housing formed by the housing half shell and the wall region of the main body of the vehicle body has as high a remission degree as possible (preferably ideally 100%), no light is lost through the scattering on the inner wall region in the indirect light coupling into the light inlet region of the light distributor. Thus, in particular, a light distribution that is as homogeneous as possible can be realized for the light that is to be coupled to the light inlet region of the light distributor and to be decoupled from the light outlet region of the light distributor.

The illumination module preferably has a dual function: on the one hand, the illumination module can serve to emit illumination light in order to illuminate or highlight an area of a vehicle component, in particular. On the other hand, the illumination module can also serve to emit signal light as needed.

The term "signal light" as used herein means, in particular, light that is used in order to indicate a state and preferably an operating state, in particular of a vehicle component, or which is used in order to indicate a situation, preferably a hazardous or warning situation.

If, for example, the illumination module is used to illuminate or highlight particularly relevant areas of a charging or tank recess, the signal light emitted by the illumination module can be used to, for example, display a current charging state. This can be indicated, for example, by the intensity and/or the hue of the signal light emitted by the illumination module.

Alternatively or additionally, it is conceivable that the signal light of the illumination module represent the expected remaining charging time.

Alternatively or preferably additionally, the signal light emitted by the illumination module serves, optionally or as needed, to represent an error message and/or to represent a confirmation during the charging process. The error message relates, for example, to the event that the charging plug is not correctly inserted and/or locked, because in this situation the battery of the vehicle cannot be charged. On the other hand, positive information indicating that the charging operation is occurring correctly and/or that the charging plug is correctly locked is also helpful for the user. Any charging interruptions can also be indicated accordingly.

In this context, it is particularly conceivable for the illumination module to output the corresponding signal light only if no light is required to illuminate the area of the charging or tank recess.

However, this aspect of the invention is not limited to illumination modules for charging or tank recess. The illumination module according to the invention is in particular also suitable for illumination or highlighting of, for example, a handle arrangement, in particular an interior door handle arrangement, of a vehicle.

In this application example, it can also be desired that not only an area of the handle arrangement is illuminated or illuminated, but rather that a corresponding signal light is also output via the illumination module, for example, in order to indicate a hazardous or warning situation. This can be the case, for example, if the handle arrangement is not to be actuated due to the traffic situation, but the handle arrangement or, if necessary, an emergency release of the handle arrangement can be indicated to the vehicle occupant via the decoupled signal light.

According to preferred realizations, it is provided for this purpose that the light source support of the illumination module preferably includes a first light source in the form of an LED and at least one second light source, preferably in the form of an LED, wherein the individual light sources are preferably independently controllable.

For example, the first light source of the light source support can serve to emit light required to illuminate or highlight the area of the vehicle component, while the second light source serves to emit light necessary for the signal light. However, it is of course also conceivable that only a single light source, if necessary, can emit light for illumination or highlighting of the area of the vehicle component and the signal light.

In particular, it lends itself that a control device is associated with the illumination module to actuate the at least one light source of the illumination module, preferably such that, in particular, at least one area of the vehicle component can be illuminated optionally or as needed with the illumination module, or that signal light from the illumination module, in particular for indicating a state, preferably an operating state, in particular of a vehicle component, or to indicate a situation, preferably a hazardous or warning situation, can be output.

The control device can be part of the illumination module and can be integrated in the light source support, in particular, or otherwise connected to the light source support by way of signal technology.

According to exemplary embodiments, the control unit is preferably designed to set the color, the intensity, the luminous intensity, and/or a flashing frequency of the at least one light source in particular in dependence on whether illumination light or signal light is to be output by the illumination module.

The invention is not limited to illumination modules having only a single light outlet region via which light emitted by the at least one light source of the light source support can be decoupled from the housing. Rather, it is conceivable that at least two light outlet regions, which are preferably arranged separately from one another, are associated with the illumination module.

According to realizations of an illumination module having at least two light outlet regions, it is provided that a first portion of the light emitted by the at least one light source is decoupled as illumination light for the area of the vehicle component, while a second portion of the light emitted by the at least one light source is decoupled via the second light outlet region, for example as signal light.

It is also conceivable, however, that two different regions of the vehicle component are illuminated via the at least two light outlet regions, preferably with different intensities.

In this context, it can be provided in particular that the first portion of the light emitted by the at least one light source and emitted via the first light outlet region depends in particular on a radiometric radiation power emitted with the at least one light source into a first space angle region, while the second portion of the light emitted by the at least one light source and decoupled at the second light outlet region depends in particular on a radiometric radiation power emitted with the at least one light source at a second solid angle range.

The first solid angle range preferably at least partially matches the radiating angle of the at least one light source, while the second solid angle range is preferably at least partially outside the radiating angle of the at least one light source.

This embodiment is based on the finding that most light sources/illuminating means emit different amounts of light in different directions. The directional characteristic of the light source can thus be exploited in order to determine the intensity of the light decoupled over the first and second light outlet regions.

The problem mentioned above and underlying the invention is further solved by a vehicle component including a main body, and furthermore including an illumination module of the aforementioned type, which is connected, in particular detachably and preferably via a clip and/or catch connection, to a wall region of the main body.

In particular, it is provided that at least the housing half shell of the illumination module is attached/connected to the light source support and the at least one light source on an internal wall region of the main body that is not visible to the user. This is the so-called B-side of the vehicle component, for example.

The housing half shell of the illumination module and the wall region of the main body form a housing, in particular, which includes at least one light outlet region optically coupled to a window region formed in the main body.

For example, the vehicle component according to the invention can be a handle arrangement, in particular an interior door handle arrangement, of a vehicle. This handle arrangement preferably includes a main body, which forms a handle shell at least in regions. On the surface of the main body, which is not visible when used as intended, the housing half shell of the illumination module is arranged.

In particular, the illumination module is connected to the main body such that an area of the handle shell or an area of an actuating portion of the door handle arrangement can be illuminated with the illumination module.

Alternatively, the vehicle component is configured as a charging or tank recess, wherein the illumination module is connected to the main body of the charging or tank recess such that an area of the charging or tank recess, in particular in the area of a charging plug arrangement, can be illuminated by the illumination module. Again, the housing half shell of the illumination module should be arranged on an interior surface of the main body of the loading or tank recess that is not visible when used as intended.

Further application examples of the illumination module, which are also intended to form part of the claimed invention, are interior cladding components of a vehicle, in particular in the area of the dash, the center console, or cladding parts of body elements, in particular in the area of the doors.

BRIEF DESCRIPTION OF THE DRAWINGS

Exemplary embodiments of the present invention are described in more detail in the following with reference to the accompanying drawings.

The following are shown.

DETAILED DESCRIPTION

Figure 1:
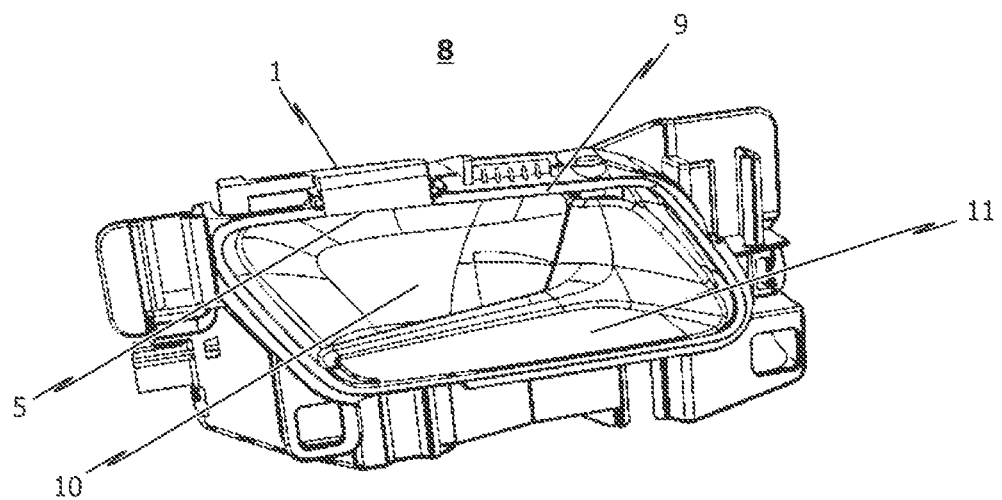
FIG. 1 shows schematically, and in a first isometric view, an exemplary embodiment of a vehicle component according to the present invention in the form of an interior door handle assembly with an exemplary embodiment of the illumination module according to the present invention.
Figure 2:
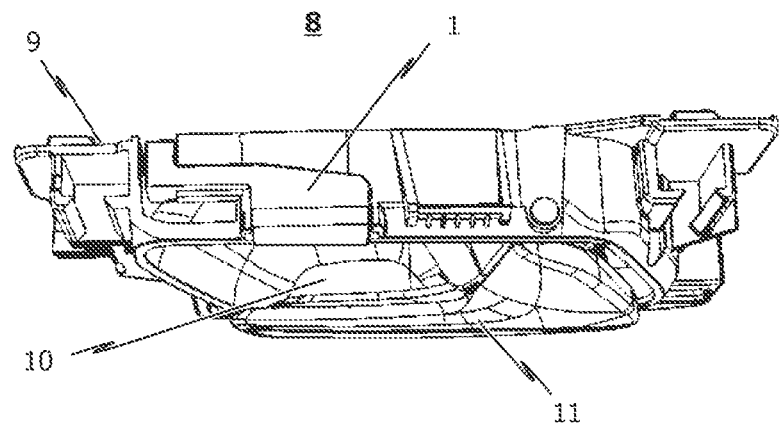
FIG. 2 shows schematically, and in a second isometric view, the exemplary embodiment of the vehicle component according to FIG. 1 with the exemplary embodiment of the illumination module according to the invention.
Figure 3:
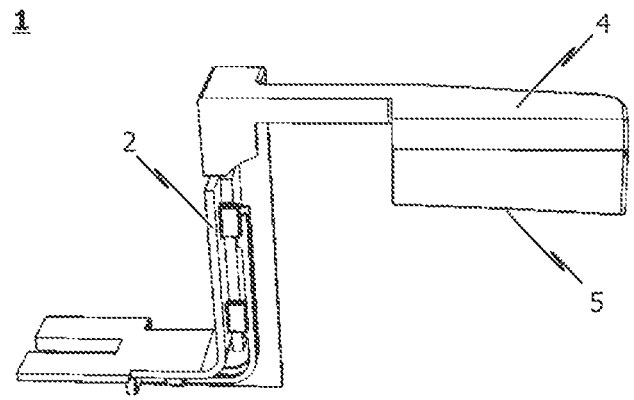
FIG. 3 shows schematically, and in a first isometric view, the illumination module used in the vehicle component according to FIG. 1.
Figure 4:
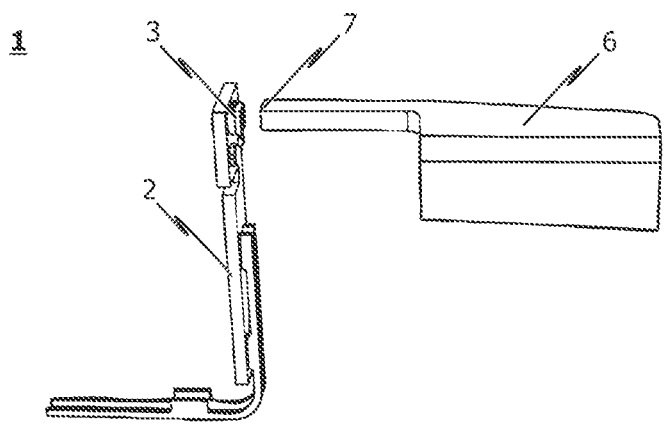
FIG. 4 shows schematically, and in an isometric view, the exemplary embodiment of the illumination module according to the invention according to FIG. 3 without the housing half shell.
Figure 5:
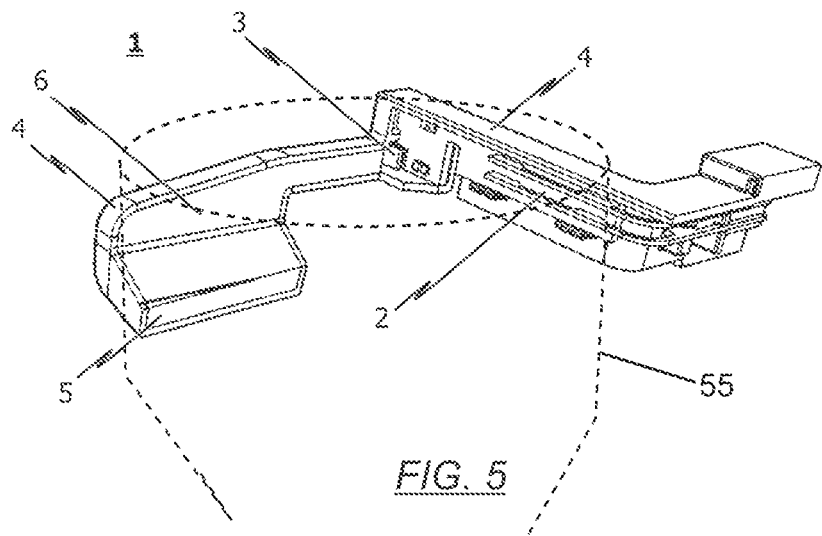
FIG. 5 shows schematically, and in a second isometric view, the illumination module used in the vehicle component according to FIG. 1.
Figure 6:
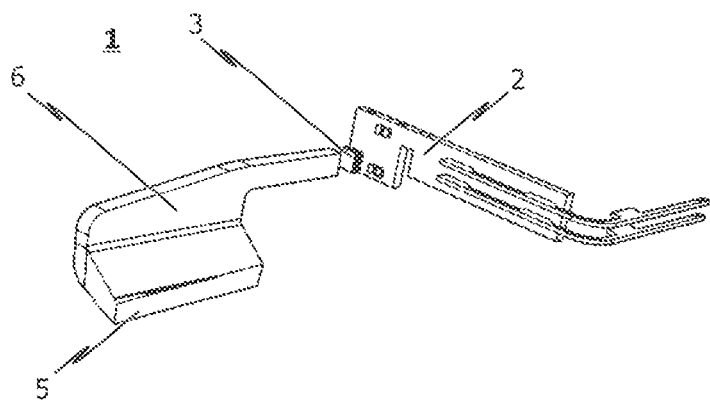
FIG. 6 shows schematically, and in an isometric view, the exemplary embodiment of the illumination module according to the invention according to FIG. 5 without the housing half shell.
Figure 7:
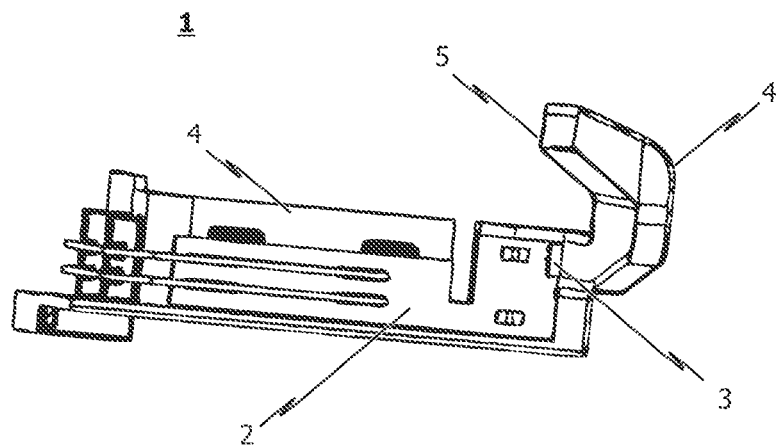
FIG. 7 shows schematically, and in a bottom view, the illumination module used on the vehicle component according to FIG. 1.
Figure 8:
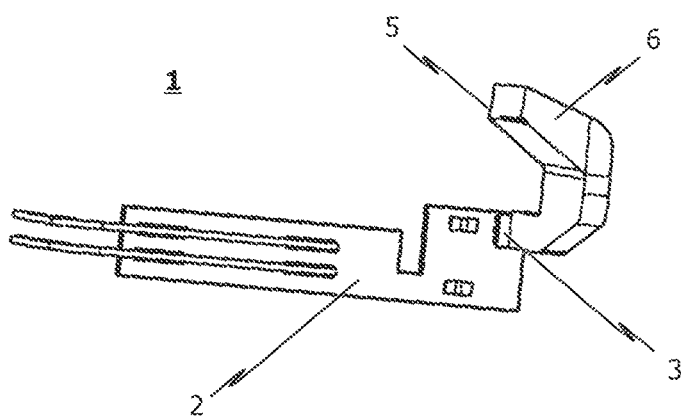
FIG. 8 shows schematically, and in a bottom view, the illumination module according to FIG. 7, but without the housing half shell.

Exemplary embodiments of the present invention are described in more detail in the following with reference to the accompanying drawings. In these embodiments, illumination modules of the type according to the invention are used in order to illuminate an area of a vehicle component 8, optionally or as needed.

Vehicle component 8 is a part of a handle assembly of a vehicle, wherein, however, the present invention is not limited to this application or type of vehicle component 8.

As can in particular be seen from the isometric views in FIGS. 1, 2 and 9 to 12, the handle arrangement 8 provided with exemplary embodiments of the illumination module 1 according to the invention is, for example, an interior door handle arrangement including a housing 9 (main body) and an actuating portion 11 movably arranged on the housing 9. The interior door handle arrangement 8 serves for opening and/or closing a vehicle door from the vehicle interior. To this end, the interior door handle arrangement 8 is mounted in the interior of a vehicle, such as a passenger vehicle or a commercial truck.

The invention accordingly also relates to a vehicle having a vehicle component 8 mounted therein, and in particular an interior door handle arrangement 8 mounted therein.

The interior door handle arrangement 8 includes a housing 9, which serves as a main body with which the interior door handle arrangement 8 is attached to a vehicle door. An actuating portion 11 that a vehicle occupant can manually actuate, for example grip, is arranged on the main body acting as the housing 9. The actuating portion 11 can be movably arranged on the main body 9, for example such that the actuating portion can pivot or is translationally movable.

As shown in the drawings, this can be a handle lever, for example, which can be pivotally mounted on the main body serving as a housing 9. However, the actuating portion 11 can for example also be a button or the like actuated by a vehicle occupant. The actuating portion 11 can be formed to be actuated by a vehicle occupant in order to open and/or close a vehicle door from the interior The housing 9 or the main body can include a support portion of, for example, a first plastic material and a decorative portion, preferably a visual section, which can consist of a different material than the support portion, preferably connected to the support portion. The support portion preferably supports the decorative portion, in particular the visible portion. The decorative portion, and preferably the visible portion, is directly visible from the vehicle interior and typically faces the vehicle interior. It forms the so-called A-surface, which is subject to particularly high visual requirements. The support portion forms a so-called B surface and can be not directly visible from the vehicle interior at least in sections. For example, it can be disposed on the rear side of the main body of the handle arrangement 8 facing away from the vehicle interior. However, the support portion can regionally also form a visible surface facing the vehicle interior that is then directly visible from the vehicle interior.

As shown, the main body 9 of the interior door handle arrangement 8 in particular forms a handle shell 10, which receives the actuating portion 11 at least in regions.

For illumination or highlighting of the handle shell 10 and/or for highlighting of at least a region of the actuating portion 11 of the handle arrangement 8, an illumination module 1 is provided.

Figure 13:
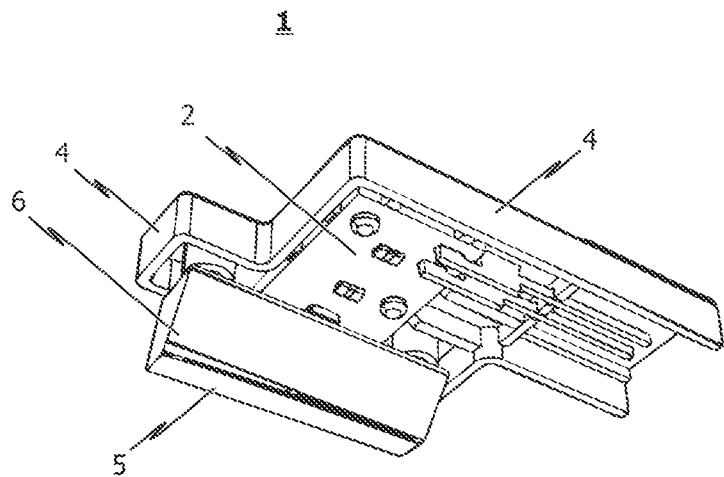
FIG. 13 shows schematically, and in an isometric view, the illumination module used in the vehicle component according to FIG. 9.
Figure 14:
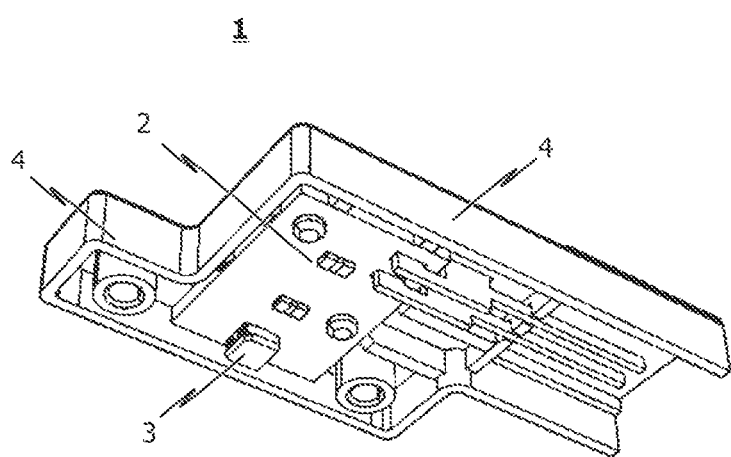
FIG. 14 shows schematically, and in an isometric view, the exemplary embodiment of the illumination module according to the invention according to FIG. 13 without the housing half shell.

A first exemplary embodiment of the illumination module 1 according to the present invention is shown in FIG. 3 to FIG. 8, while a second exemplary embodiment of the illumination module 1 according to the present invention can be taken from the illustrations in FIG. 13 and FIG. 14

The embodiments of the illumination module 1 according to the invention have in common that they can be mounted in a very space-saving manner directly in the area or at least in the immediate vicinity of the area of the vehicle component 8 to be illuminated as needed or optionally.

In order to be able to minimize the design space necessary for the integration of the illumination module 1, the existing wall or an area of the existing wall of the main body 9 of the vehicle component 8 is used in the illumination modules 1 according to the invention in order to form a corresponding housing for the illumination module 1 or for receiving the electronics of the illumination module 1

In this respect, in the exemplary embodiments of the illumination module 1 according to the invention shown in the drawings, it is provided that the illumination module 1 includes a housing half shell 4, which is detachably connectable to a wall region of the main body 9 of the vehicle component 8, in particular, and preferably connectable via a clip and/or catch connection, such that a housing is formed, defined on the one hand by the interior wall of the housing half shell 4 of the illumination module 1 and on the other hand by the wall region of the main body 9 of the vehicle component 8.

In this housing, a light source support 2 of the illumination module 1 with at least one light source 3 is received at least in regions.

The housing, and in particular the housing half shell 4, is preferably made of an opaque material in order to prevent light emitted by the at least one light source 3 inside the housing from leaking out of the housing.

The housing includes at least one light outlet region 5, through which the light emitted by the at least one light source 3 in the housing can optionally exit, in particular, in order to illuminate an area of the vehicle component 8 optionally or as needed, for example the handle shell 10 or the actuating portion 11 of the interior door handle assembly 8, which is shown in the drawings as a purely exemplary embodiment of a suitable vehicle component 8.

The at least one light output region 5 of the illumination module 1 can be configured such that the light emitted by the light source 3 received in the housing of the illumination module 1 is directly coupled to the area of the vehicle component 8 to be illuminated or illuminated via this light output region 5.

In the exemplary embodiments of the illumination module 1 according to the invention shown in the drawings, it is optionally provided that the respective illumination modules further include a light distributor 6 received at least in regions from the housing half shell 4 of the illumination module 1.

The light distributor 6 preferably includes a body made of a transparent material, in particular plastic material, wherein this body of the light distributor 6 is designed to conduct at least a part of the light coupled via the light inlet region of the light distributor 6 into the light distributor 6 to the at least one light outlet region 5 of the light distributor 6 by reflection at the boundary surface of the body.

In particular, the light distributor 6 includes a light inlet region 7, via which at least a portion of the light emitted by the at least one light source 3 in the housing of the illumination module 1 can be coupled into the light distributor 6.

In addition, in the embodiments of the illumination module 1 according to the invention shown in the drawings, the light distributor 6 includes a light outlet region 5, via which at least a portion of the light coupled into the light distributor 6 via the light inlet region 7 can be decoupled, in particular towards the area of the vehicle component 8 to be illuminated.

Figure 9:
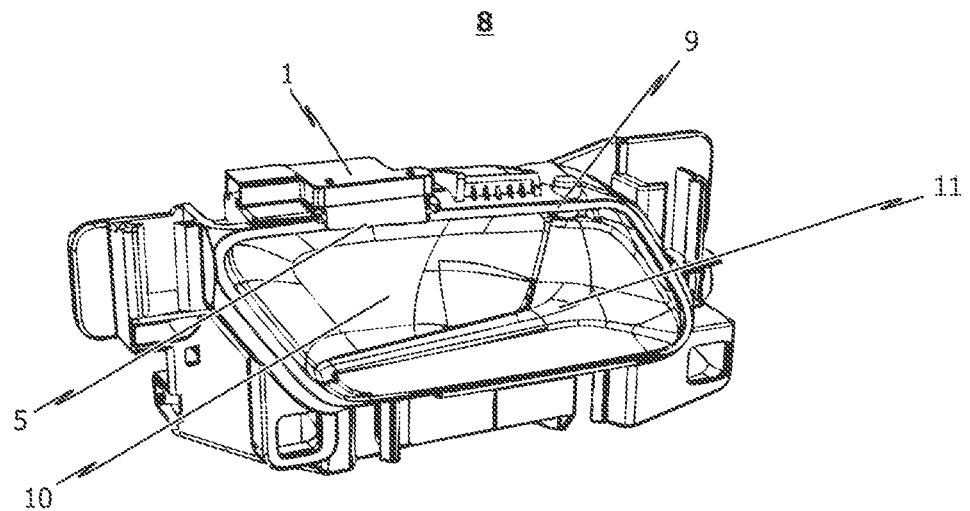
FIG. 9 shows schematically, and in a first isometric view, a further exemplary embodiment of a vehicle component according to the invention in the form of an interior door handle assembly with a further exemplary embodiment of the illumination module according to the invention.
Figure 10:
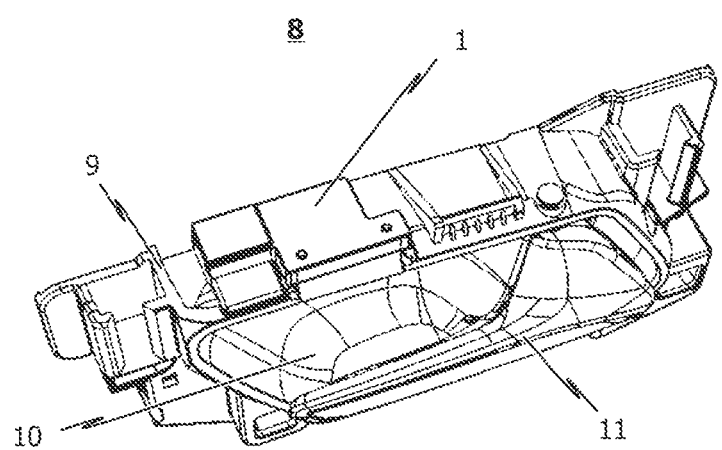
FIG. 10 shows schematically, and in a second isometric view, the exemplary embodiment of the vehicle component according to FIG. 9 with the further exemplary embodiment of the illumination module according to the invention.
Figure 11:
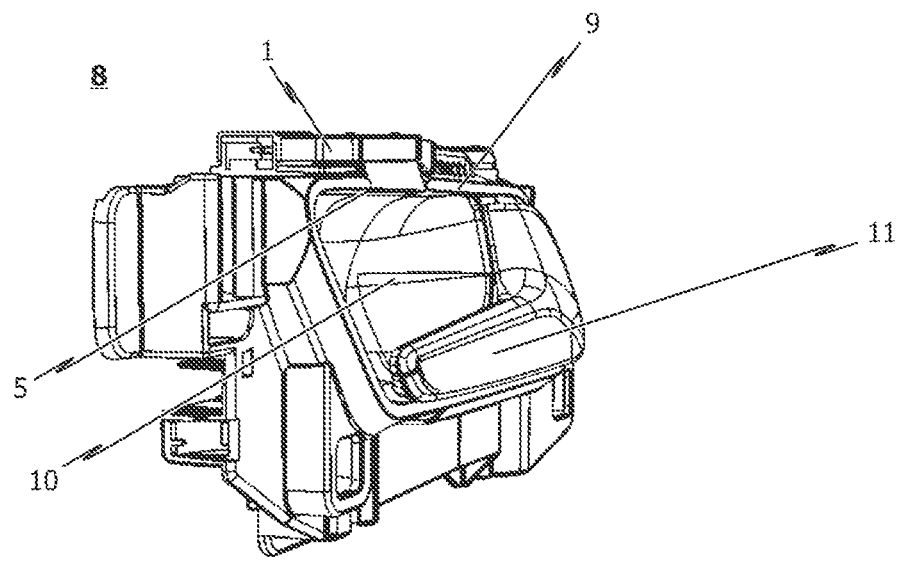
FIG. 11 shows schematically, and in a third isometric view, the exemplary embodiment of the vehicle component according to FIG. 9 with the further exemplary embodiment of the illumination module according to the invention.
Figure 12:
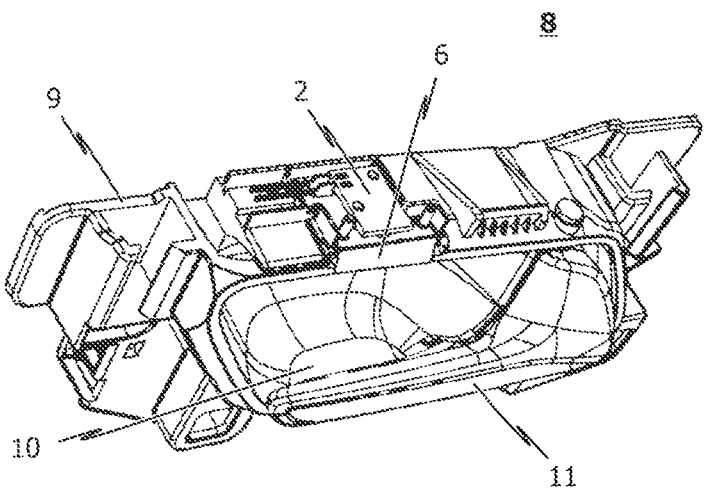
FIG. 12 shows schematically, and in a fourth isometric view, the exemplary embodiment of the vehicle component according to FIG. 9 with the further exemplary embodiment of the illumination module according to the invention, but without the housing half shell.

As can be seen in the isometric views, for example in FIG. 1 and in FIG. 9, in particular, it is suggested in this context that the main body 9 of the vehicle component 8 include a window region for at least partially or regionally receiving the light output region of the light distributor 6

The light distributor 6 is preferably configured in such a way that, in the installed state, a light outlet surface of the light outlet region 5 of the light distributor 6 is flush adjacent to the wall region surrounding the window region of the main body 9 of the vehicle component 8.

In the exemplary embodiments of the illumination module 1 according to the invention shown in the drawings, the housing half shell 4 can be connectable to a wall region of the main body 9 of the vehicle component 8, in particular detachably and preferably via a clip and/or catch connection.

This is, in particular, a wall region of the main body 9 of the vehicle component 8 that is not visible to the vehicle occupant in the installed state of the vehicle component 8. It therefore particularly lends itself that the housing half shell 4 of the illumination module 1 is connected to the so-called B-side of the main body 9 of the vehicle component 8.

In the exemplary embodiments of the illumination module 1 according to the invention shown in the drawings, it is provided that the light source 3 of the light source support of the illumination module 1 is arranged with respect to the light inlet region 7 of the light distributor 6 such that at least a portion of the light emitted by the light source 3 is directly couplable to the light inlet region 7 of the light distributor 6.

According to alternative design variants, however, it can also be provided that at least one light source 3 of the illumination module 1 is arranged with respect to the light inlet region 7 of the light distributor 6 such that the light emitted by the at least one light source 3 is couplable as scattered light into the light inlet region 7 of the light distributor 6. In this context, in particular, it can be provided that the light emitted by the at least one light source 3 can be coupled into the light inlet region 7 of the light distributor 6 as scattered light scattered on at least one interior wall region of the housing half shell 4 and/or the housing.

In this embodiment in particular, which is not shown in the drawings, it is advantageous that the interior wall region of the housing half shell 4 and/or the housing has a degree of remission of at least 75%, preferably at least 85%, and more preferably at least 90%.

As shown in the drawings, the housing half shell 4 of the exemplary embodiments of the illumination module 1 is configured in order to preferably receive the light source support 2 via a clip connection.

Furthermore, it is provided that the housing half shell 4 includes at least one connecting element for preferably detachably connecting the light distributor 6 to the housing half shell 4.

In this respect, it is particularly advantageous that the at least one connecting element of the housing half shell 4 is configured in order to form a detachable connection to light distributors of different types, sizes, and/or forms in order to use the housing half shell 4 with the light source support 2 as a standard component, which can be used on different vehicle components in order to illuminate an area thereof.

Although, in the embodiments shown in the drawings of the illumination module 1 according to the invention, each of these includes a light source support 2 having only a single LED as the light source 3, it is generally conceivable that the light source support 2 includes a plurality of light sources 3, preferably each in the form of an LED.

Alternatively or additionally, it is also generally conceivable for the housing formed by the housing half shell 4 of the illumination module 1 on the one hand and the wall region of the vehicle component 8 or the main body 9 of the vehicle component 8 on the other hand to not only include a single opening as a light outlet region 5 but rather a plurality of separately arranged light outlet regions in order to illuminate different areas of the vehicle component 8.

Overall, the illumination module 1 is characterized by its compact design, which allows the illumination module 1 to be arranged and installed directly on the vehicle component 8 to be illuminated or illuminated.

It should be noted at this point that the present invention is not limited to the use of the illumination module 1 in a handle arrangement 8.

Rather, the illumination module 1 according to the invention is suitable for different vehicle components, for example also for optional illumination or highlighting of a charging or tank recess 55 (shown schematically in FIG. 5) or for displaying optical information for such a charging or tank recess.

Further aspects of the illumination module 1 according to the present invention are described below with reference to the illustrations in FIG. 15 to FIG. 17.

Figure 15:
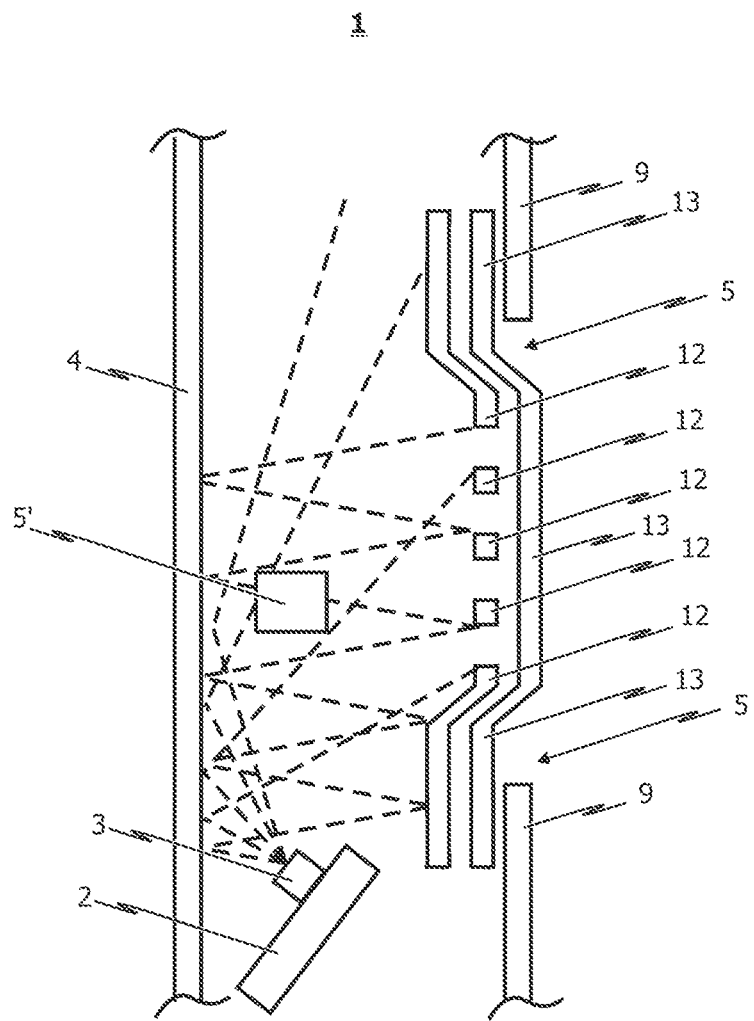
FIG. 15 shows schematically, and in a sectioned view, another exemplary embodiment of the illumination module according to the invention.

In detail, FIG. 15 shows schematically, and in a cross-sectional view, a further embodiment of the illumination module 1 according to the invention. The illumination module 1 shown therein serves in particular to decouple light for contour illumination via a first light outlet region 5 and to decouple light for ambient illumination via a further second light outlet region 5'.

The illumination module 1 includes a housing half shell 4 shown only in regions in FIG. 15, which is in particular detachably connected to a wall region of a main body 9 of a vehicle component via a clip and/or catch connection (not shown in FIG. 15). In this way, a housing is formed at least in regions, wherein a light source support 2 having at least one light source 3 is preferably arranged in the form of an LED.

The illumination module 1 shown schematically shown in FIG. 15 includes two separate light outlet regions 5, 5', via which light emitted by the at least one light source 3 can be decoupled from the housing.

In particular, in the embodiment shown in FIG. 15, it is provided that the at least one light source 3 is arranged with respect to the first and second light outlet region 5, 5' of the housing in such a way that the light emitted by the at least one light source 3 can be decoupled via the two light outlet regions 5, 5' from the housing as scattered light and preferably exclusively as scattered light and in particular as scattered light scattered on at least one interior wall region of the housing half shell 4 and/or the housing.

In this context, it is advantageous that the at least one interior wall region of the housing half shell 4 and/or the housing preferably has a degree of remission of at least 75%, preferably at least 85%, and more preferably at least 90%

It is schematically indicated in FIG. 15 that, for purposes of contour illumination, the illumination module 1 includes a preferably replaceable or exchangeable and preferably partially light-opaque masking 12 on the at least one light outlet region 5. Further, the illumination module 1 includes a preferably replaceable or exchangeable and preferably partially transparent or translucent cover 13 on the at least one light outlet region 5.

Figure 16:
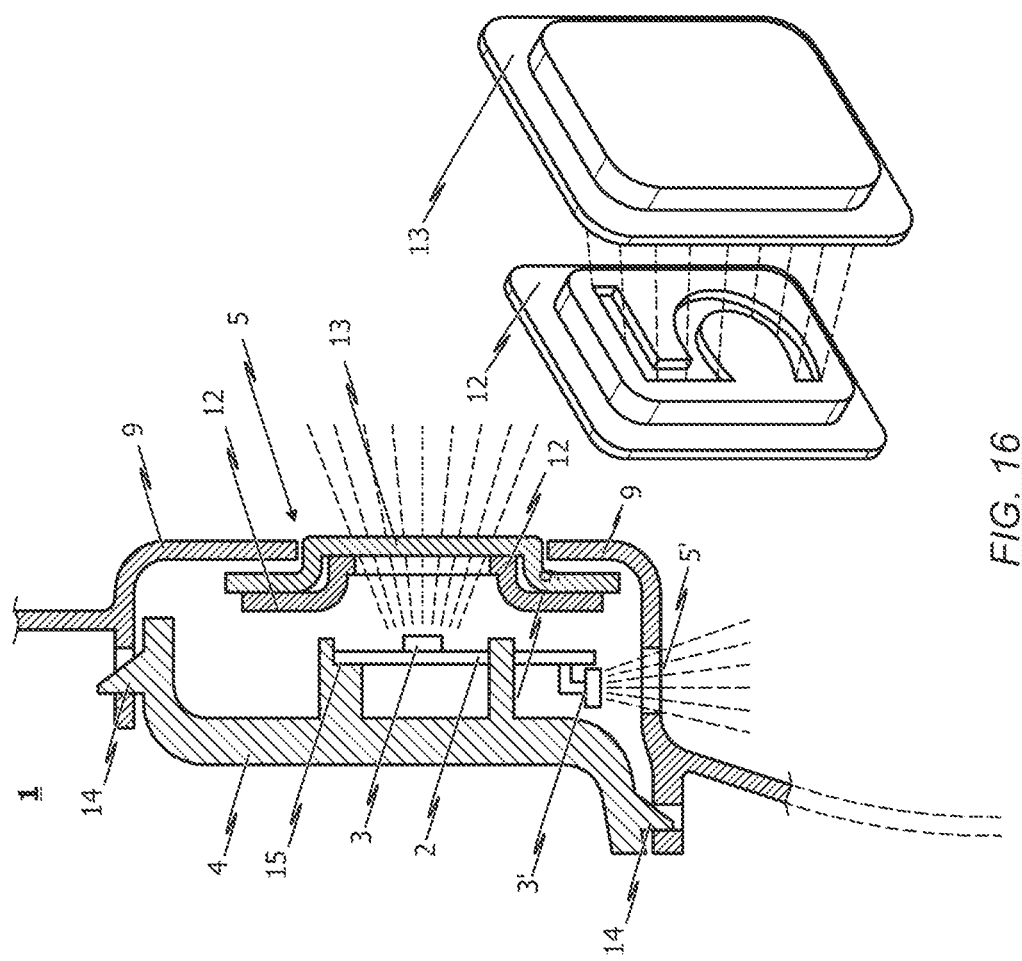
FIG. 16 shows schematically, and in a sectioned view, another exemplary embodiment of the illumination module according to the invention.

The masking 12 used in both embodiments according to FIG. 15 and the transparent or translucent cover 13 used in the embodiment according to FIG. 15 are shown again in an isometric view in FIG. 16, respectively.

The exemplary embodiment according to FIG. 15 is in particular characterized in that light can be decoupled from the housing via a single light source 3 via the at least two light outlet regions 5, 5', wherein the decoupled light appears particularly uniform and diffuse due to its reflection on the interior wall of the housing.

In FIG. 16 schematically, and in a sectional view, another exemplary embodiment of then illumination module 1 according to the invention is shown.

As indicated, this illumination module 1 also consists of a housing half shell 4, which is connected to a wall region of the main body 9 of the vehicle component, in particular detachably and preferably via a clip and/or catch connection 14. In this way, a housing is formed, wherein the housing includes a first light output region 5, in particular for contour illumination, and a second light output region 5', in particular for ambient illumination.

As in the embodiment according to FIG. 15, the first light outlet region 5 includes a corresponding masking 12 as well as a cover 13.

By contrast to the previously described embodiment according to FIG. 15, in the embodiment according to FIG. 16, it is provided that the light source support 2 includes at least one first light source 3 associated with the first light outlet region 5 and at least one further second light source 3' associated with the second light outlet region 5'.

Figure 17:
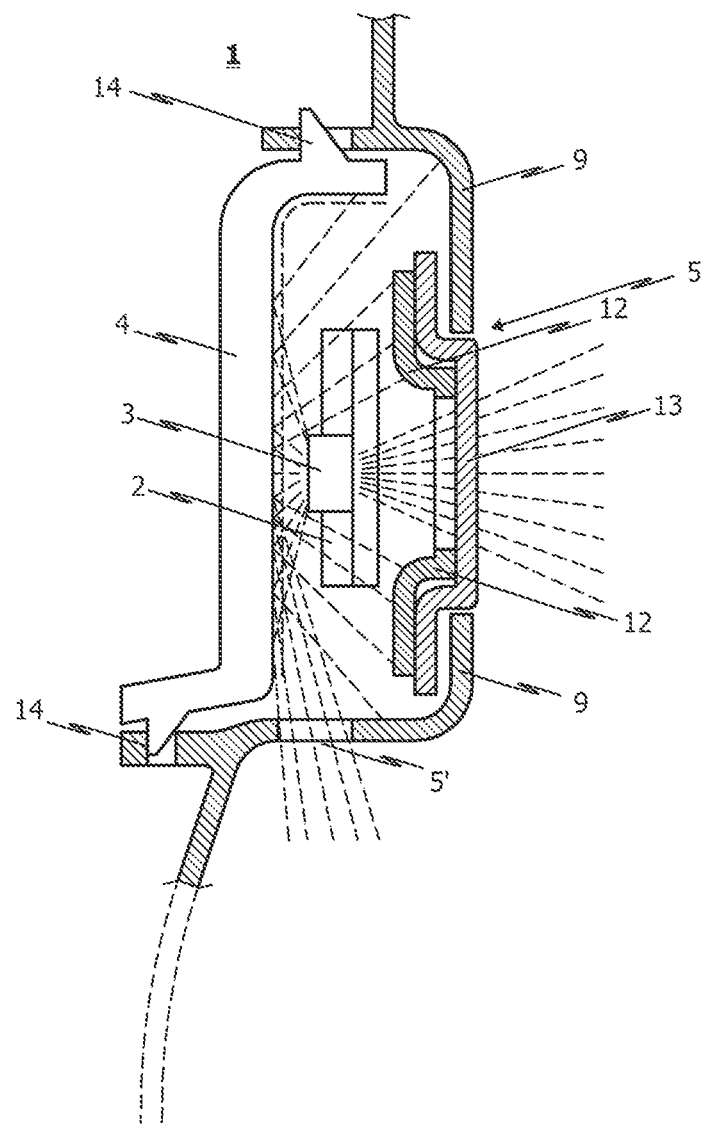
FIG. 17 shows schematically, and in a sectioned view, another exemplary embodiment of the illumination module according to the invention.

A further development of the illumination module 1 in FIG. 16 is shown schematically and in a sectional view in FIG. 17.

The embodiment according to FIG. 17 differs from the embodiment according to FIG. 16 in particular in that, in the embodiment according to FIG. 17, a single light source 3 is used in order to emit light that reflects on the interior wall of the housing and then exits the first and second light outlet region 5, 5' as scattered light.

In particular, the invention is not limited to the embodiments shown in the drawings, but rather results when all of the features disclosed herein are considered together.

LIST OF REFERENCE NUMERALS

1 Illumination module
2 Light source support
3, 3' Light source
4 Housing half shell
5, 5' Light outlet region of the housing
6 Light distributor
7 Light inlet region of the light distributor
8 Vehicle component/interior door handle assembly
9 Main body of the vehicle component
10 Handle shell
11 Actuating portion
12 Masking
13 Transparent/translucent cover
14 Clip/catch connection
15 Clip/catch connection

The invention claimed is:

1. An illumination module for illuminating at least one region of a vehicle component, wherein the vehicle component includes a main body, which is insertable into an opening of a vehicle body or is connectable to the vehicle body, and wherein the illumination module includes:
  a light source support, in the form of a printed circuit board, having at least one light source;
  a housing half shell, which is connectable to a wall region of the main body of the vehicle component such that a housing, defined by the housing half shell of the illumination module and by the wall region of the main body of the vehicle component, is formed,
  wherein at least part of the light source support having the at least one light source is received in the housing, and wherein the housing includes at least one light outlet region, via which light emitted by the at least one light source can be decoupled from the housing;
  wherein the at least one light source is arranged with respect to the light outlet region of the housing such that the light, emitted by the at least one light source, can be decoupled from the housing via the at least one light outlet region as scattered light that is scattered by at least one interior wall region of the housing, wherein the at least one interior wall region of the housing has a degree of remission of at least 75%.

2. The illumination module according to claim 1,
  wherein, for contour illumination,
    the illumination module includes a replaceable or exchangeable and partially light-opaque masking on the at least one light outlet region, or
    the illumination module includes a replaceable or exchangeable and partially transparent or translucent cover on the at least one light outlet region.

3. The illumination module according to claim 1,
  wherein the housing includes a first light outlet region for contour illumination and a second light outlet region, arranged separately from the first light outlet region, for ambient illumination, wherein the light emitted in the housing by the at least one light source, can be decoupled from the housing as scattered light via the first light outlet region and via the second light outlet region.

4. The illumination module according to claim 1,
  wherein the housing includes a first light outlet region for contour illumination and a second light outlet region, arranged separately from the first light outlet region, for ambient illumination, wherein the light source support includes at least one first light source associated with the first light outlet region and at least one second light source associated with the second light outlet region.

5. The illumination module according to claim 1,
  wherein the illumination module includes a light distributor at least partly received by the housing half shell, which includes a light inlet region, via which at least a part of the light emitted by the at least one light source can be coupled into the light distributor, and which includes at least one light outlet region, via which at least a part of the light coupled via the light inlet region into the light distributor can be decoupled in the direction of the region of the vehicle component to be illuminated.

6. The illumination module according to claim 5, wherein the main body of the vehicle component includes a window region for at least partly receiving the at least one light outlet region of the light distributor, wherein the light distributor is designed in such a way that in the installed state, a light outlet surface of the at least one light outlet region adjoins flush on the wall region of the main body of the vehicle component surrounding the window region.

7. The illumination module according to claim 5, wherein:
the at least one light source is arranged with respect to the light inlet region of the light distributor in such a way that at least a part of the light emitted by the at least one light source can be coupled directly into the light inlet region;
or
the at least one light source is arranged with respect to the light inlet region of the light distributor in such a way that the light emitted by the at least one light source can be coupled as scattered light that is scattered by at least one interior wall region of the housing, into the light inlet region of the light distributor, wherein the at least one interior wall region of the housing has a degree of remission of at least 75%.

8. The illumination module according to claim 5, wherein the housing half shell includes at least one connecting element for detachable connection of the light distributor to the housing half shell, wherein the at least one connecting element of the housing half shell is designed to form a detachable connection to light distributors of different types, sizes, or forms.

9. The illumination module according to claim 5, wherein the light distributor includes a body made of a transparent material which is designed to conduct at least a part of the light coupled via the light inlet region of the light distributor into the light distributor to the at least one light outlet region of the light distributor by reflection at the boundary surface of the body.

10. The illumination module according to claim 1, wherein the housing half shell is designed to receive the light source support via a clip connection.

11. The illumination module according to claim 1, wherein:
the housing includes at least two light outlet regions separate from one another;
or
the light source support includes a first light source and at least one second light source, wherein the individual light sources are activatable independently of one another.

12. The illumination module according to claim 1, wherein a control unit is associated with the illumination module for activating the at least one light source, such that: (i) at least one region of the vehicle component can be illuminated by illumination light using the illumination module or (ii) signal light can be output by the illumination module, wherein the control unit is designed to set at least one of the color, the intensity, the luminous intensity, or a flashing frequency of the at least one light source based upon on whether illumination light or signal light is to be output by the illumination module.

13. A vehicle component having a main body and an illumination module according to claim 1, which is connected, via a clip connection or a catch connection, to a wall region of the main body such that a housing is formed by the housing half shell of the illumination module and the wall region of the main body, which housing includes at least one light outlet region optically coupled to a window region formed in the main body.

14. The vehicle component according to claim 13, wherein:
the vehicle component is a handle assembly having a main body at least partly forming a handle shell, wherein the illumination module is connected to the main body such that a region of the handle shell can be illuminated using the illumination module,
or
the vehicle component is a charging recess or tank recess having a main body insertable into an opening of a vehicle body, wherein the illumination module is connected to the main body such that a region of the charging recess or tank recess can be illuminated using the illumination module.

15. An illumination module for illuminating at least one region of a vehicle component, wherein the vehicle component includes a main body, which is insertable into an opening of a vehicle body or is connectable to the vehicle body, and wherein the illumination module includes:
a light source support, in the form of a printed circuit board, having at least one light source;
a housing half shell, which is connectable to a wall region of the main body of the vehicle component such that a housing, defined by the housing half shell of the illumination module and by the wall region of the main body of the vehicle component, is formed,
wherein at least part of the light source support having the at least one light source is received in the housing, and wherein the housing includes at least one light outlet region, via which light emitted by the at least one light source can be decoupled from the housing;
wherein the illumination module includes a light distributor received at least in regions by the housing half shell, which includes a light inlet region, via which at least a part of the light emitted by the at least one light source can be coupled into the light distributor, and which includes at least one light outlet region, via which at least a part of the light coupled via the light inlet region into the light distributor can be decoupled in the direction of the region of the vehicle component to be illuminated;
wherein the housing half shell includes at least one connecting element for detachable connection of the light distributor to the housing half shell, wherein the at least one connecting element of the housing half shell is designed to form a detachable connection to light distributors of different types, sizes, or forms.

16. An illumination module for illuminating at least one region of a vehicle component, wherein the vehicle component includes a main body, which is insertable into an opening of a vehicle body or is connectable to the vehicle body, and wherein the illumination module includes:
a light source support, in the form of a printed circuit board, having at least one light source;
a housing half shell, which is connectable to a wall region of the main body of the vehicle component such that a housing, defined by the housing half shell of the illumination module and by the wall region of the main body of the vehicle component, is formed,
wherein at least part of the light source support having the at least one light source is received in the housing, and wherein the housing includes at least one light outlet region, via which light emitted by the at least one light source can be decoupled from the housing;

wherein the illumination module includes a light distributor received at least in regions by the housing half shell, which includes a light inlet region, via which at least a part of the light emitted by the at least one light source can be coupled into the light distributor, and which includes at least one light outlet region, via which at least a part of the light coupled via the light inlet region into the light distributor can be decoupled in the direction of the region of the vehicle component to be illuminated;

wherein the light distributor includes a body made of a transparent material which is designed to conduct at least a part of the light coupled via the light inlet region of the light distributor into the light distributor to the at least one light outlet region of the light distributor by reflection at the boundary surface of the body.

* * * * *